Dec. 15, 1931.　　W. T. BELL ET AL　　1,837,100
MECHANICALLY PROPELLED VEHICLE
Filed Feb. 7, 1930　　2 Sheets-Sheet 1
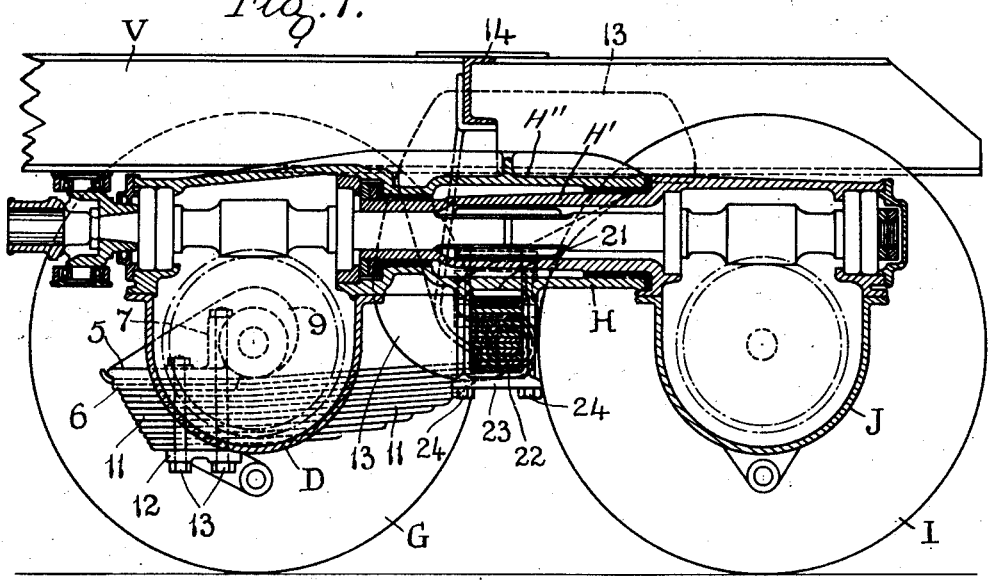
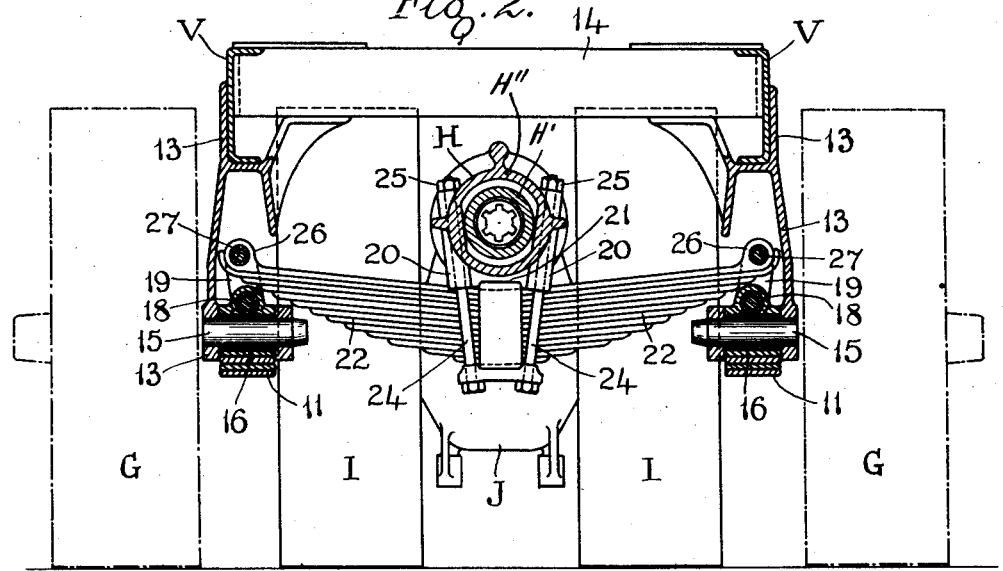
INVENTORS
William T. Bell,
Francis J. Bretherton
BY
ATTORNEY

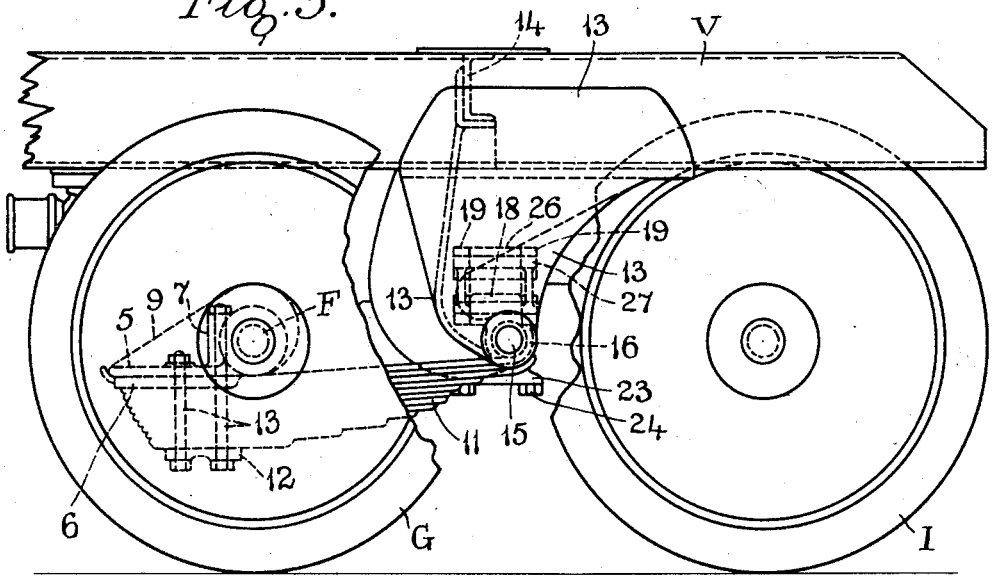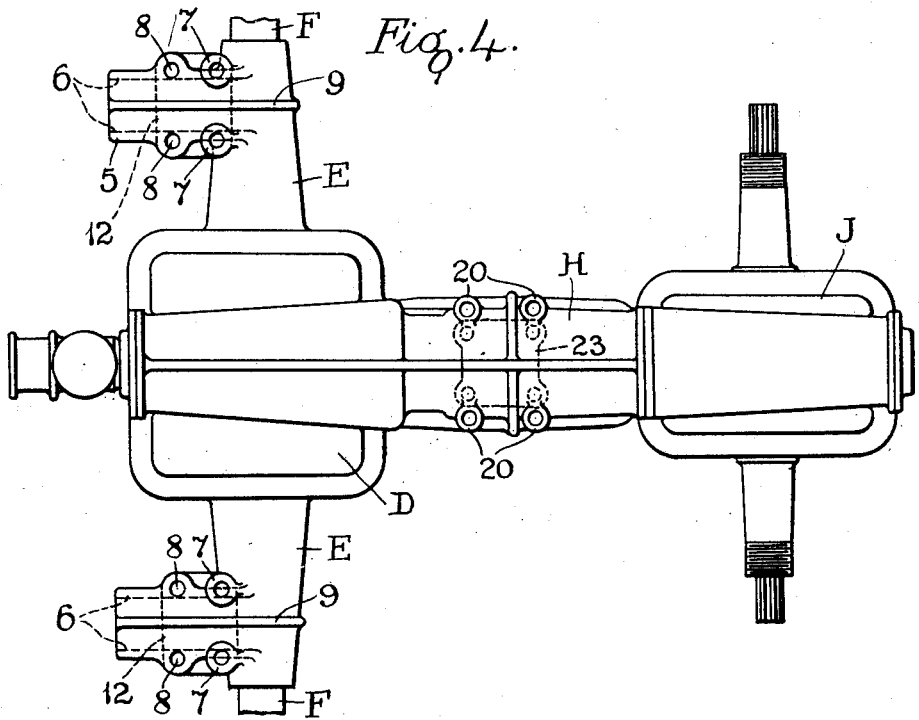

Patented Dec. 15, 1931

1,837,100

UNITED STATES PATENT OFFICE

WILLIAM THOMAS BELL, OF LINCOLN, AND FRANCIS JAMES BRETHERTON, OF LONDON, ENGLAND

MECHANICALLY PROPELLED VEHICLE

Application filed February 7, 1930, Serial No. 426,725, and in Great Britain October 22, 1929.

This invention relates to improvements upon the invention set forth in the United States Patent No. 1,741,091 granted to us 24th December 1929.

According to said patent the spring suspension of the two parts of the frame which are connected together and carry the gear axles and wheels, comprises projections or arms forming part of the frame, one on each side, one pair of wheels being mounted outside the frame and connected to leaf springs secured to the chassis, one on each side at points in line and at a position between two pairs of wheels carried by the frame, and a portion of the frame which carries one set of wheels being capable of a rotary motion about the other part of the frame whereby the frame and wheels may have a rocking motion on the connection to the springs and one set of wheels having a further rocking motion at right angles thereto whereby all the wheels are in constant contact with the ground under all conditions.

Now the object of this invention is to improve the spring connection of such frame and wheels with the chassis.

According to this invention we dispense with the projections or arms for connecting the axle casings of one set of wheels with the half elliptic springs carried by the chassis and we secure to the outer end of each of said axle casings by a bracket, or other suitable means, a quarter elliptic or leaf spring, the free ends of which springs are positioned in line between the two sets of wheels.

To the tubular connection, between the sections of the frame and preferably underneath same, is secured by brackets or other suitable means a half elliptic spring, this being positioned transversely of the frame with its ends positioned in proximity to the free ends of the quarter elliptic springs, and the ends of the quarter and half elliptic springs are connected together by bolts or pins, shackles and links in any suitable manner, the ends of the quarter elliptic springs which are connected to the half elliptic spring are further secured to brackets depending from and secured to the chassis.

In simple form the ends of the quarter elliptic springs not connected to axle casings are provided with lugs or other devices, each connectible to a pin projecting from one of the chassis brackets and each lug or device has an eye. A pin extends through each of such eyes and a link at each end of such eye, such links being respectively connected by pins to the ends of the half elliptic spring.

By this invention the quarter elliptic springs act as radius rods and they determine the position of the axles in relation to the chassis and such springs, together with the half elliptic spring, also support the chassis and body under light load ensuring easy running of the vehicle, the half elliptic spring coming into further action under increased or full load and taking the increased weight, thus ensuring a spring support up to the maximum load of the vehicle.

The invention will be more clearly understood from the following description aided by the annexed drawings which illustrate a preferred form of construction.

Figure 1 is a sectional side view of the driving wheels and a portion of the chassis.

Figure 2 is a cross sectional view looking towards the rear, the main drive wheels being shown in chain-dotted lines.

Figure 3 is a side elevation of the driving wheels and chassis, part of the wheels being broken away to show the bracket which carries the quarter elliptic springs.

Figure 4 is a plan view of a frame which carries the gear and axles, the wheels being omitted.

In the drawings the front main drive wheels G, G and the rear pair of wheels I, I and the frame comprising tubular connection H and axle and boxes D, J and casings E, E are shown in the opposite position to that shown in Figure 1 of the drawings of said Patent No. 1,741,091.

The tubular connection H comprises two tubular projections H', H", swiveled one within the other. These projections extend respectively from the year and front sections of the wheel frame. This connection allows rotation of one frame section with respect to the other about the common axis of the tubular projections, thus permitting all four of the wheels to run on the ground at all times.

According to the present invention on the axle casings E, E projecting from the gear box portion D are cast or secured lugs 5, one on each casing E, E near the end thereof. These lugs 5 project in front of the axle casings E, E and each is flat on its underside and each has its longitudinal edges 6 turned downwardly, and each lug has two hollow pillars 7, one on each side, and also two holes 8, 8, one on each side, both holes and pillars coinciding with the edges 6 which are thickened at the part next the holes and pillars for strengthening purposes. A web 9, also for strengthening purposes, extends upwardly from the upper side of each lug 5, such web being cast with or secured to the lug 5 and axle casing E.

Underneath each lug 5 is positioned a half elliptic spring 11, such spring being secured by a plate 12 engaging the bottom of the spring and by bolts and nuts 13 passed through the plate 12 and holes 8 and pillars 7, the whole being held securely together as will be well understood.

Each spring is positioned under one of the axle casings E and the axle F mounted in such casing and extends towards the other pair of wheels I, I with its free end positioned between the two sets of wheels G, G, I, I.

A bracket 13 depends from each side of the chassis V and between the wheels G, G, I, I, said brackets being of any desired construction and being secured to the chassis V and to a girder 14 extending across the chassis V and secured to the latter. Each bracket 13 has a pin 15 projecting laterally therefrom toward the longitudinal center of the chassis and carrying the free end of one of the springs 11 and whereby the chassis V is supported on springs 11, 11.

The free ends of the top leaves of the springs 11, 11 are provided with apertured lugs 16, 16 which are carried by the pins 15, the lugs 16 each having an eye 18 which carries a link 19.

The tubular connection H of the gear box D of the frame or casting carries four tubular pillars 20, 20, two on each side, these extending at an angle from the top to the bottom of the connection H and on the outside thereof. A flat recess 21 is formed on the underside of the tubular casing H between the tubular pillars 20 to receive the upper central portion of a half elliptic spring 22, such spring 22 being held in said recess by a plate 23 and bolts 24 passed through the tubular pillars and held tightly thereto by nuts 25, as will be well understood.

The half elliptic spring 22 is positioned between the two sets of wheels G, G, I, I, and across the chassis, and the free ends of the top plates of the spring 22 have lugs 26 which are connected by pins 27 to the links 19 carried by the eyes 18 in a well known manner.

The gearing contained in the frame or casting may be of any desired kind.

What we do claim as our invention and desire to obtain by Letters Patent is:—

1. In a mechanically propelled vehicle including a chassis frame, two pairs of driving wheels and driving axles for said wheels spaced transversely of their axes, an axle carrying frame comprising sections each carrying the axles for a pair of wheels and means connecting said sections and permitting rotation of one section on an axis transverse to the driving axles of the other or nonrotatable section, springs connected to the nonrotatable section of the axle carrying frame and supporting the chassis frame, and a spring also attached to the nonrotatable section of the axle carrying frame and connected to the other springs at points between the axles for the pairs of wheels.

2. In a mechanically propelled vehicle including a chassis frame, two pairs of driving wheels and driving axles for said wheels spaced transversely of their axes, an axle carrying frame comprising sections each carrying the axles for a pair of wheels and means connecting said sections and permitting rotation of one section on an axle transverse to the axles of the other or nonrotatable section, quarter elliptic springs connected to the nonrotatable section of the axle carrying frame and projecting towards the axles of the other section and supporting the chassis, a half elliptic spring secured to the nonrotatable section of the axle carrying frame and connected to the quarter elliptic springs at points between the axles for the pairs of wheels.

In testimony whereof we have hereunto set our hands.

WILLIAM THOMAS BELL.
FRANCIS JAMES BRETHERTON.